US008746206B2

(12) United States Patent
Diggs

(10) Patent No.: US 8,746,206 B2
(45) Date of Patent: Jun. 10, 2014

(54) DOUBLE-ACTING SCOTCH YOKE ASSEMBLY FOR X-ENGINES

(76) Inventor: Matthew Byrne Diggs, Farmington, MI (US)

( * ) Notice: Subject to any disclaimer, the term of this patent is extended or adjusted under 35 U.S.C. 154(b) by 173 days.

(21) Appl. No.: 13/518,951

(22) PCT Filed: Jun. 28, 2011

(86) PCT No.: PCT/US2011/042109
§ 371 (c)(1),
(2), (4) Date: Jun. 25, 2012

(87) PCT Pub. No.: WO2012/003171
PCT Pub. Date: Jan. 5, 2012

(65) Prior Publication Data

US 2012/0272758 A1 Nov. 1, 2012

Related U.S. Application Data

(60) Provisional application No. 61/398,680, filed on Jun. 29, 2010.

(51) Int. Cl.

| | |
|---|---|
| ***F16C 7/00*** | (2006.01) |
| ***F02B 75/32*** | (2006.01) |
| *F02B 3/06* | (2006.01) |
| *F02B 75/02* | (2006.01) |
| *F02B 41/04* | (2006.01) |
| *F01B 9/02* | (2006.01) |
| *F02B 75/04* | (2006.01) |

(52) U.S. Cl.
CPC . *F02B 75/32* (2013.01); *F02B 3/06* (2013.01); *F02B 2075/025* (2013.01); *F02B 41/04* (2013.01); *F01B 9/023* (2013.01); *F02B 75/048* (2013.01)
USPC .......................................................... 123/197.4

(58) Field of Classification Search
CPC .... F02B 75/32; F02B 41/04; F02B 2075/025; F02B 75/048; F01B 9/023
USPC .......................................................... 123/197.4
See application file for complete search history.

(56) References Cited

U.S. PATENT DOCUMENTS

| | | | | |
|---|---|---|---|---|
| 4,112,826 | A * | 9/1978 | Cataldo | 92/13.1 |
| 4,559,838 | A | 12/1985 | Neuenschwander | |
| 5,131,353 | A * | 7/1992 | Bauer et al. | 123/55.5 |
| 5,456,076 | A * | 10/1995 | Zornes | 60/525 |

(Continued)

FOREIGN PATENT DOCUMENTS

| | | | |
|---|---|---|---|
| DE | 3922986 | A1 * | 1/1991 |
| DE | 196 17 207 | A1 | 11/1997 |

(Continued)

*Primary Examiner* — Lindsay Low
*Assistant Examiner* — Charles Brauch
(74) *Attorney, Agent, or Firm* — Peter J. Rashid

(57) ABSTRACT

A Double-Acting Scotch Yoke (DASY) assembly includes a first yoke; a second yoke attached to the first yoke at a first flat-to-flat interface; a first piston attached to the first yoke at a second flat-to-flat interface; and a second, opposing piston attached to the second yoke at a third flat-to-flat interface. The planes of all of the flat-to-flat interfaces are perpendicular to a common, center axis of the first and second pistons. An X-engine crank train includes a plurality of DASY assemblies.

5 Claims, 10 Drawing Sheets

(56) References Cited

U.S. PATENT DOCUMENTS

| | | | | |
|---|---|---|---|---|
| 5,782,213 | A * | 7/1998 | Pedersen | 123/55.2 |
| 5,799,628 | A | 9/1998 | Lacerda | |
| 5,873,339 | A | 2/1999 | Isogai | |
| 6,065,440 | A * | 5/2000 | Pasquan | 123/198 F |
| 6,209,495 | B1 * | 4/2001 | Warren | 123/55.2 |
| 2007/0240673 | A1 * | 10/2007 | Schmied | 123/197.4 |

FOREIGN PATENT DOCUMENTS

| | | | |
|---|---|---|---|
| EP | 187930 | A2 * | 7/1986 |
| WO | WO 9216730 | A1 * | 10/1992 |
| WO | 02/27143 | A1 | 4/2002 |

* cited by examiner

DOUBLE-ACTING SCOTCH YOKE ASSEMBLY FOR X-ENGINES

CLAIM TO PRIORITY

This application is a National stage application of PCT Application No. PCT/US11/42109, filed on Jun. 28, 2011, which claims priority to U.S. Application Ser. No. 61/398,680, filed Jun. 29, 2010, the entire contents of both are incorporated herein by reference.

BACKGROUND OF THE INVENTION

The invention relates generally to internal combustion piston engines, fluid pumps and similar machines and, more particularly to a Double-Acting Scotch Assembly (DASY) for an X-Engine configuration.

The most widely used engine configurations in use today are in-line, "V" and horizontally-opposed or 'flat'. Almost all of these engines use conventional connecting rods ("con rods") in the power conversion system. Con rods, due to the nature of their motion, produce multiple orders of vibration such that there is no practical way to cancel out all of the resultant vibration in an engine that has con rods. Some conventional engine configurations which use con rods, such as the 90° V-8, have balance for $1^{st}$-order and $2^{nd}$-order vibrations, but practically all engines with conventional con rods are never balanced for $3^{rd}$-orders and above.

The Scotch yoke is a mechanism for converting the linear motion of a slider into rotational motion or vice-versa. The piston or other reciprocating part is directly coupled to a sliding yoke with a slot that engages a pin on the rotating part. A bearing block interfaces the rotating motion at the crankshaft with the sliding linear motion at the yoke. The shape of the motion of the piston is a pure sine wave over time given a constant rotational speed.

Unlike conventional engine configurations in use today, the scotch yoke mechanism is a mechanism that couples the reciprocating pistons to the rotating crankshaft with true harmonic motion for the reciprocating mass such that an engine that uses scotch yokes can be said to be "100% balanced for all orders" if it is balanced for $1^{st}$-order forces and moments.

With regards to reducing friction in an engine, the scotch yoke mechanism can be used in a double-ended or "double-acting" fashion such that each reciprocating assembly has a piston at either end so each crank pin bearing on the crankshaft is coupled to two pistons instead of just a single piston. In this way, the ratio of total engine bearings/cylinders is therefore reduced and the crankshaft is shorter and lighter for a given number of cylinders. A further benefit of the double-acting scotch yoke is that the fluid motion inside the crankcase is minimized because opposite pistons simply push air in between them, whereas in "V"-type engines and in-line engines there is a larger mass of air which is pushed around the engine's bulkheads in a way that causes larger amounts of fluid friction.

SUMMARY OF THE INVENTION

An object of the invention is to provide a Double-Acting Scotch Yoke (DASY) mechanism for X-engines that, relative to conventional piston engines which use con rods, improves the efficiency and performance of the engine, reduces noise and vibration, reduces the size and weight of the engine, and decreases cost of production.

In one aspect, a Double-Acting Scotch Yoke (DASY) mechanism has a reciprocating assembly that is a series of four components rigidly joined together: "piston-yoke-yoke-piston", with the two pistons at opposite ends of the assembly having a common center axis, wherein all of the interfaces between the components in the reciprocating assembly being flat-to-flat interfaces, and wherein the planes of the interfaces are perpendicular to the axis of the opposing pistons. These interfaces include, but are not limited to: piston-to-yoke, yoke-to-yoke, yoke-to-piston.

The DASY assembly of the invention has dowel locators at each flat-to-flat interface to align the components, wherein the axes of the dowels are parallel to the common center axis of the opposing pistons, and having corresponding precision holes in each component at each interface to receive a dowel. The assembly includes threaded fasteners in which the axes of the fasteners for the yoke-to-yoke interface are parallel to the common center axis of the opposing pistons. In addition, the axes of the fasteners for the piston-to-yoke and the yoke-to-piston interfaces are parallel to the common center axis of the opposing pistons. Furthermore, the yoke is a common part that is used twice in the DASY assembly such that there is a threaded hole on one leg of the yoke and a non-threaded through-hole on the other leg of the yoke, which results in having fasteners located diagonally opposite in the assembled DASY assembly.

In addition, the DASY assembly is coupled to a bearing block assembly that is a primarily made up of two identical parts to form a box-like structure, and having a plurality of fasteners which secure the two primary parts together, and having a sideways hole through the structure, and having a pair of shell bearings which are secured within the sideways hole, with the shell bearings rotatably engaged with a crankpin bearing on a crankshaft, and having a pair of linear bearing surfaces which are both parallel to the axis of the sideways hole and are both facing outwards on opposite sides of the box-like structure, and with each linear bearing surface being flanked with a pair of inward-facing linear bearing surfaces such that in two places there are two linear bearing surfaces on each side of the bearing block assembly which are on a common plane which is transverse to the axis of the sideways hole. Furthermore, the structure that supports the two pairs of linear bearing surfaces forms the widest part of the bearing block assembly as viewed from the side such that the axis of the sideways hole is seen cross-wise. The angular width of this protruding structure, which exists in four places on each bearing block assembly, and is defined by the angle of the protrusion formed by the widest points of the protrusion and the centerline of the sideways hole as viewed from the side with the sideways hole is viewed in true perspective, this angle is favored to be significantly less than 90 degrees.

In view of the foregoing, one aspect of the invention is a Double-Acting Scotch Yoke assembly (12) for an X-Engine comprises a first yoke (22); a second yoke (24) attached to the first yoke (22) at a first flat-to-flat interface (35, 35); a first piston (18) attached to the first yoke (22) at a second flat-to-flat interface (54, 67); and a second, opposing piston (28) attached to the second yoke (24) at a third flat-to-flat interface (54, 67), wherein the planes of all of the flat-to-flat interfaces are perpendicular to a common, center axis (33) of the first and second pistons (18, 28). In another aspect of the invention, an X-engine crank train (10, 100, 200) comprises a plurality of Double-Acting Scotch Yoke assemblies (12).

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

FIG. 5(*b*) is a top isometric view of the piston of FIG. 4(*a*);

FIG. 5(*c*) is a side-section view of the piston of FIG. 4(*a*), with the plane of section being on the axis of the opposing pistons and perpendicular to the axis of the crankshaft, showing the ring structure and inner structures;

FIG. 8(*c*) is an enlarged view of adjacent bearing blocks in the X-4 engine crank train showing the minimum clearance distance between adjacent DASY assemblies;

DETAILED DESCRIPTION OF THE INVENTION

Figure 1:
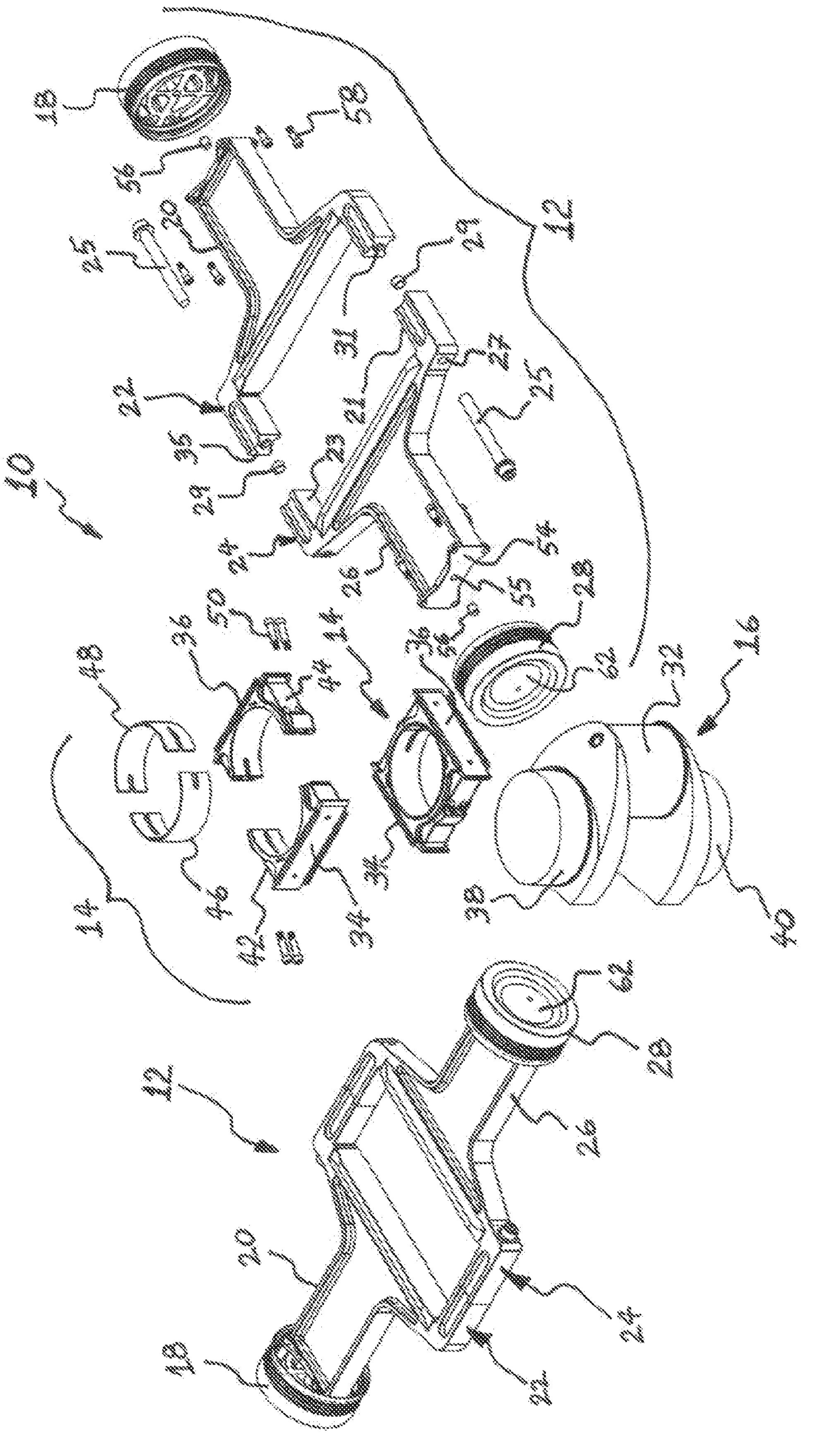
FIG. 1 is an exploded view of a DASY X-4 engine crank train including two DASY assemblies (one in exploded view), two bearing block assemblies (one in exploded view) and a crankshaft for according to an embodiment of the invention.

Below are illustrations and explanations for a Double-Acting Scotch Yoke (DASY) assembly for an X-engine configuration. However, it is noted that the DASY assembly may be configured to suit any specific application and is not limited only to the example in the illustrations.

Referring now to FIGS. 1-4, a Double-Acting Scotch Yoke (DASY) X-Engine crank train 10 is shown according to an embodiment of the invention. In general, the crank train 10 includes two DASY assemblies 12, two bearing block assemblies 14 and a crankshaft 16. In the illustrated embodiment, the X-engine crank train 10 is configured as a DASY X-4 crank train. However, it will be appreciated that the principles of the DASY assembly 12 of the invention can be applied to other X-engine crank trains, such as a X-8 engine crank train, a X-12 engine crank train, a X-16 engine crank train, and the like.

The DASY assembly 12 forms a basic building block of the DASY X-engine crank train 10 and comprises four components joined together in series:

1) a first piston 18;
2) a first yoke 22 rigidly attached to the first piston 18;
3) a second yoke 24 rigidly attached to the first yoke 22; and
4) a second piston 28 rigidly attached to the second yoke 26.

It should be noted that the first piston 18 is identical to the second piston 28, and the first yoke 22 is identical to the second yoke 24.

Figure 4:
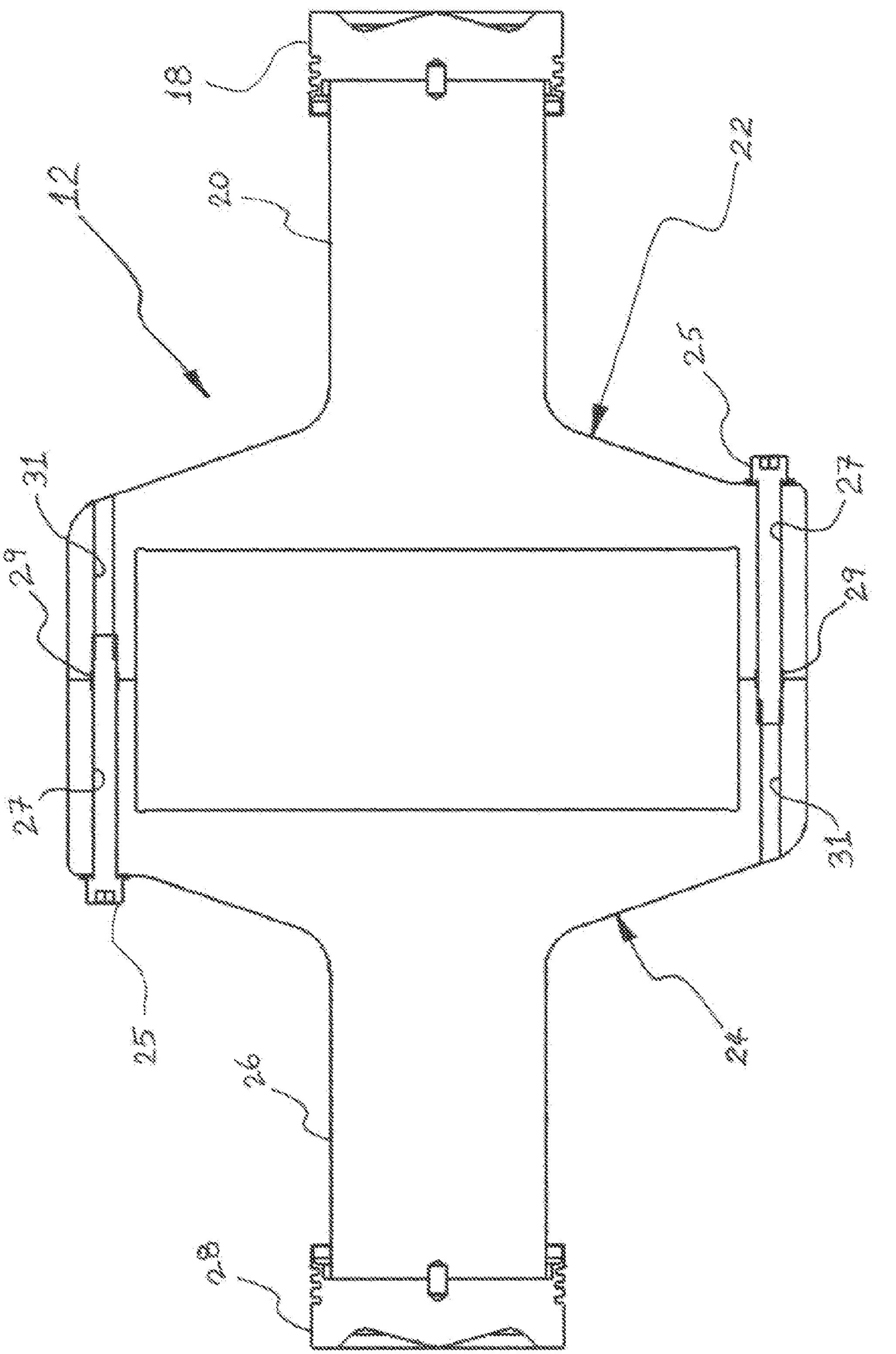
FIG. 4 is a cross sectional view of the DASY assembly of FIG. 1 taken through the central axis of the opposing pistons.

The yokes 22, 24 are rigidly connected to each other by using a pair of threaded fasteners 25, such as bolts, and the like, that are passed through a non-threaded hole 27 in one leg 21 of the yoke 22, 24 and received in a threaded hole 31 in the leg 23 of the other yoke 22, 24, as shown in FIG. 4. A dowel 29 is positioned within a corresponding pair of separate countersunk bores (not shown) that can be on-axis with holes 27, 31 or can be offset from the axis of the holes 27, 31. It will be appreciated that the invention is not limited by the use of the dowel 29 for positioning the two yokes 22, 24 with respect to each other, and that the invention can be practiced by using any suitable structure known in the art for precisely positioning the two yokes 22, 24 with respect to each other. Each leg 21, 23 of each yoke 22, 24 has a planar end surface 35 that forms a flat-to-flat interface between the two yokes 22, 24 when assembled. That is, each yoke 22, 24 has two planar end surfaces 35 that form a flat-to-flat interface between the two yokes 22, 24.

It is also noted that the yokes 22, 24 are identical to each other so that the same part can be used on both sides of the bearing block assembly 14 by rotating one of the yokes 180° with respect to the other yoke, which results in a reduction of parts necessary in the assembly 12. It is also notable that the threaded fasteners 25 are located diagonally opposite each other when the DASY assembly 12 is assembled.

Figure 3A:
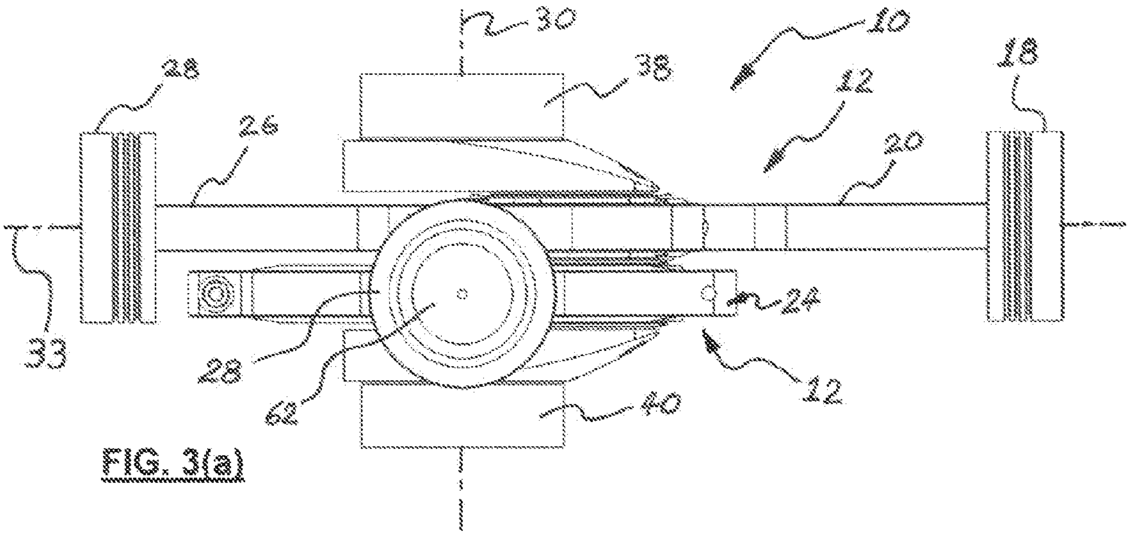
FIG. 3(*a*) is a side view, and FIG. 3(*b*) is a top-hidden-line view, of the DASY X-4 engine crank train of FIG. 1 when assembled.
Figure 3B:
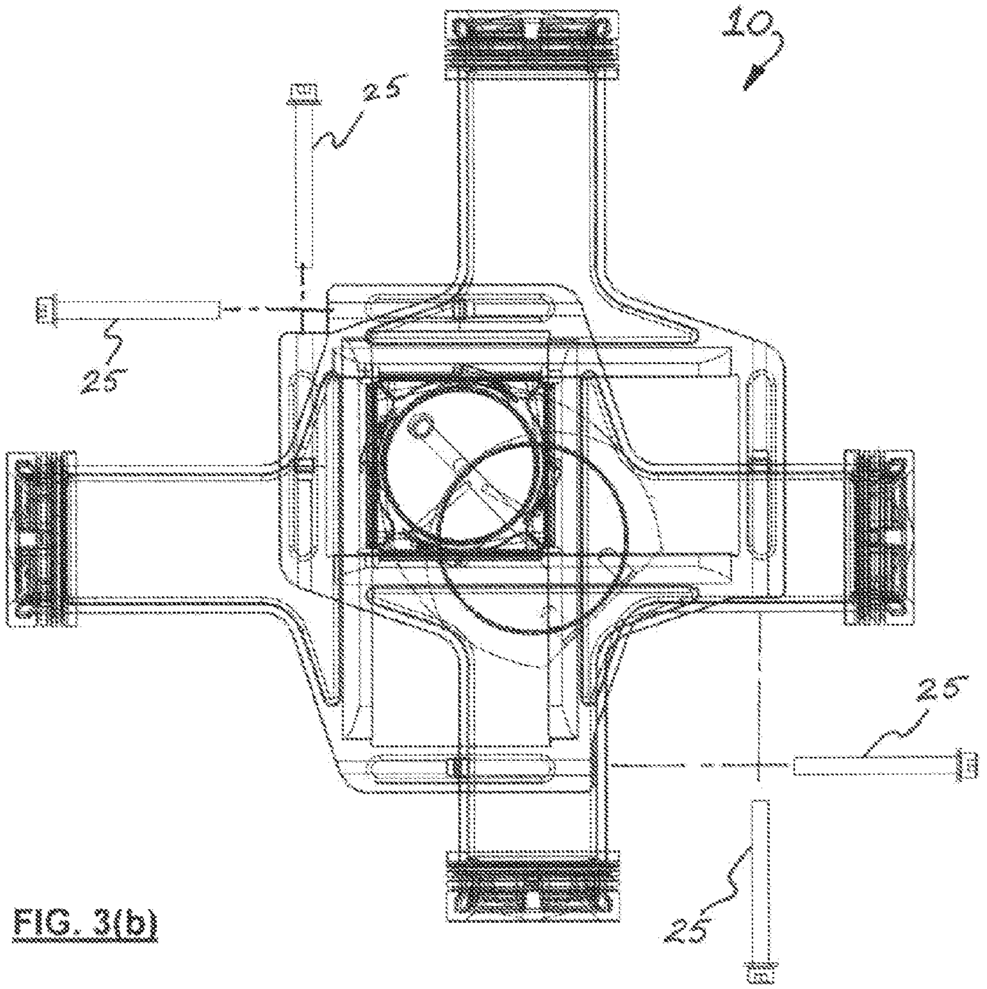

One aspect of the invention is that the yokes 22 24, the dowels 29, the threaded fasteners 25 and the pistons 18, 28 of the DASY assembly 12 in a purely symmetrical relation to a common, center axis 33 of the two opposing pistons 18, 28, and the common, center axis 33 of the two opposing pistons 18, 28 is perpendicular to a center axis 30 of the crankshaft 16 in the assembled X-engine configuration, as shown in FIG. 3. This feature enables the center-of-mass of the DASY assembly 12 to be located on the common, center axis 33 of the two opposing pistons 18, 28, which is desirable in order to achieve balance of reciprocating and rotating masses during operation of the X-engine.

It is noted that the interfaces between the four components of the DASY assembly 12 are flat-to-flat interfaces with the planes of the flat surfaces (35, 54, 67) being perpendicular to the center line 33 of the two opposing piston 18, 28, as shown in FIG. 3. These interfaces include: piston-to-yoke and yoke-to-yoke. Having this relationship is desirable for the manufacturing of the components, the assembly of the components inside an engine, as well as for minimizing stresses in the components and in the assembly in a running engine. It is also noted that the interface between the DASY assembly 12 and the bearing block assembly 14 is primarily a pair of flat-to-flat interfaces (i.e., linear bearing surfaces 34, 36 of the bearing block interface with linear bearing surfaces 72, 70 respectively, of the DASY assembly) that is perpendicular to the common, center axis 33 of the two opposing pistons 33.

The motion of the DASY assembly 12 is reciprocating harmonic (sinusoidal) motion. The result is:

- a power-conversion system which allows two coaxially-opposed cylinders of an engine to be coupled to a central crankshaft through a single crank pin bearing;

the pure sinusoidal motion such that X-engine configurations achieve $1^{st}$-order balance, thus having 100% balance for all orders of vibration;

the firing order relationship for each piston pair of the DASY assembly 12 in a 4-stroke cycle engine is 180°/540°; and the firing order relationship for each scotch yoke piston pair in a 2-stroke cycle engine is 180°/180°.

Each DASY assembly 12 is coupled to the bearing block assembly 14 in such a way that rotating motion of the crankshaft 16 is translated to a reciprocating (pure sinusoidal) motion of the DASY assembly 12. Each bearing block assembly 14 is coupled to its respective DASY assembly 12 by two linear bearing surfaces 34, 36 located at opposing ends of the bearing block assembly 14. In illustrated embodiment of the DASY X-4 engine crank train 10, two bearing block assemblies 14 are each coupled to a crank pin 32 of the crankshaft 16. The two bearing block assemblies 14 surround and engage the crank pin 32 of the crankshaft 16 and revolve, but do not rotate, around the center axis 30 of the crankshaft 16 as the crankshaft 16 rotates.

By contrast, engines that have conventional connecting rods ("con rods") often have two con rods attached to each crank pin, as in an automotive 90° V-8 engine. However, in typical con-rod engine designs it is considered difficult, or not practical, to connect more than two pistons with each crank pin. The compromise would be for the width of the engine bearings—crankshaft main bearings and crankshaft pin bearings—if three or more con rods were attached to each crank pin. The other possible compromise would be to have excessive spacing between adjacent cylinders.

It should also be noted that a radial engine that employs a master con rod with secondary con rods attached to it is an arrangement which allows multiple cylinders of an engine to be attached to a single crank pin bearing, but the compromise here is that there are at least two different piston motions (piston displacement versus crankshaft angle) occurring in this type of engine, which greatly complicates any efforts to achieve balance of even the $1^{st}$-order of vibration. Hence, there is no practical method to have $1^{st}$ and $2^{nd}$ order balance for a group of cylinders connected in this way. Furthermore, with the modern fuel injection systems used in engines now, having different piston motions would greatly complicate the calibration and emissionability of such an engine.

So, it can be seen that the Double-Acting Scotch Yoke (DASY) assembly 12 of the invention can achieve better space efficiency than con rod engines, and due to reduced fluid motion and fluid friction inside the crankcase can achieve better performance and efficiency than con-rod engines, and is preferable to master con-rod type radials for balance and emissions.

Figure 2:
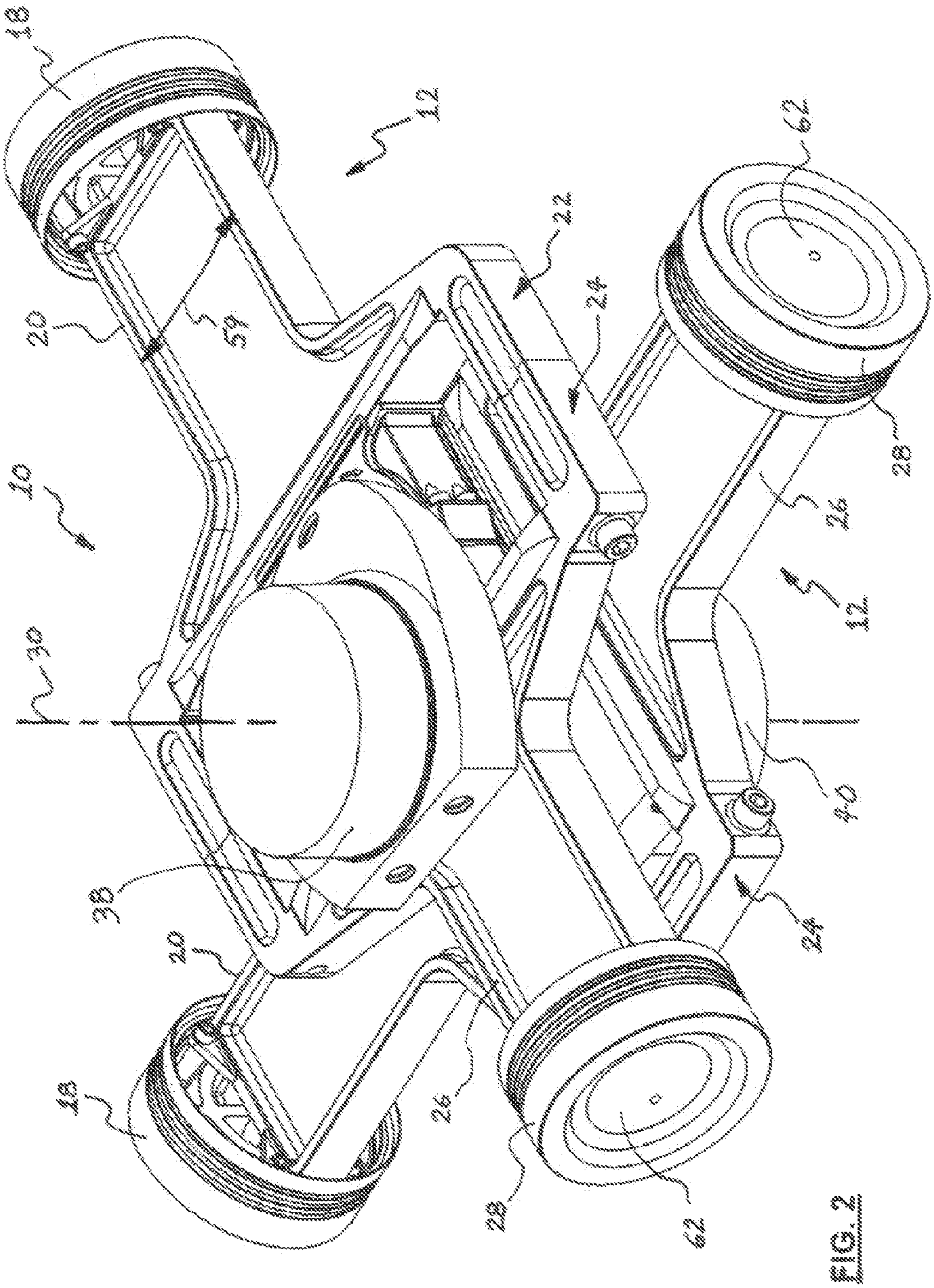
FIG. 2 is an isometric view of the DASY X-4 engine crank train of FIG. 1 when assembled.

As shown in FIGS. 1-3, a single-pin crankshaft 16 is coupled to two DASY assemblies 12 for a total of four pistons 18, 28. There are two bearing block assemblies 14—one for each DASY assembly 12—to couple the rotating motion of the crankshaft 16 with the reciprocating motion of the DASY assemblies 12. The two bearing block assemblies 14 are coupled to a common crank pin 32, but function independently of each other.

Figures 5A, 5B, 5C:
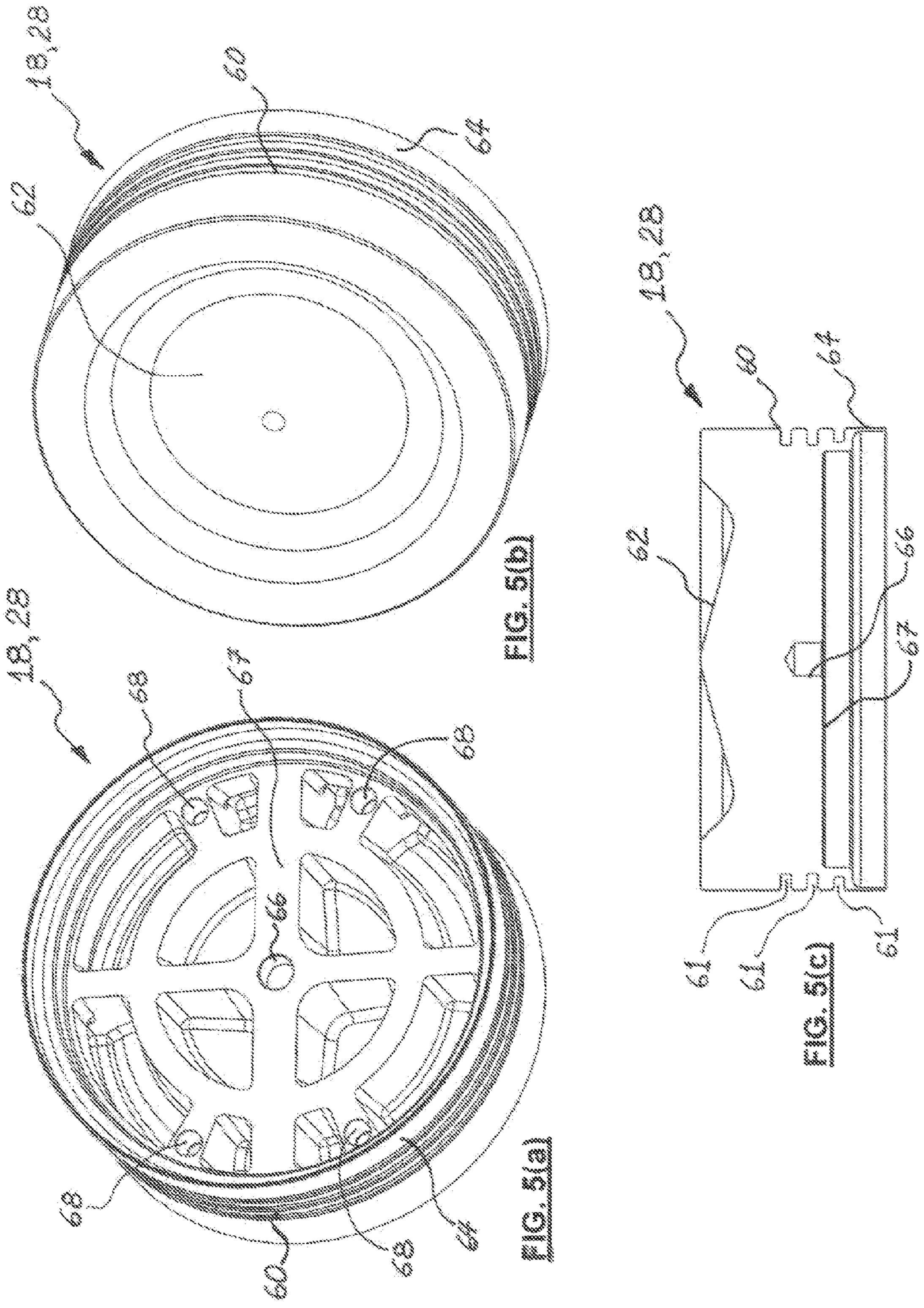
FIG. 5(*a*) is a bottom isometric view of the piston of the DASY assembly of FIG. 1 according to an embodiment of the invention.

Referring now to FIGS. 5(*a*)-(*c*), there is shown several views of the piston 18, 28. The piston 18 is designed to rigidly attach to the yoke 22 and precisely align with the rest of the DASY assembly 12, including the piston 28 rigidly attached to the yoke 24 at the opposite end of the DASY assembly 12. In order to achieve balance for the rotating and reciprocating masses, it is necessary to have the center-of-mass of the DASY assembly located on the center axis 33 of the two opposing pistons 18, 28. In the DASY assembly 12 of the invention, each piston 18, 28 is precisely aligned with the yokes 22, 24 using the flat end surface 54 of the yokes 22, 24 and a dowel 56 that is press-fit into the end surface 54 of the yokes 22, 24 at hole 55, which is precisely located on center axis 33 of the opposing pistons 18, 28. Each piston 18, 28 is rigidly attached to its respective yoke 22, 24 using threaded fasteners 58, such as bolts, and the like. It should be noted that the beam structures 20, 26 of the yokes 22, 24 have a width 59 that is as close as possible to an outer diameter of the piston 18, 28, as shown in FIG. 2. This provides the most structurally-efficient beam structure.

Each piston 18, 28 has an axisymmetric structure that forms an outer ring 60 with grooves 61 as is commonly done for pistons in internal combustion engines. In the illustrated embodiment, each piston 18, 28 has three grooves 61. However, it will be appreciated that the invention is not limited by the number of grooves, and that the invention can be practiced using any desirable number of grooves to house the desired number of piston rings to provide satisfactory performance. Each piston 18, 28 includes a combustion face 62 on its end, which is formed to suit the requirements of the combustion process being used. The opposite end of each piston 18, 28 includes a skirt bearing 64, which is a substantially axisymmetric surface that interfaces with the engine's cylinder bore surface (not shown) and has a diameter that is slightly larger than the outside diameter of the outer ring 60 of the piston 18, 28.

As shown in FIG. 5(*a*), each piston 18, 28 also includes a central bore 66 for receiving the dowel 56 and a plurality of threaded holes 68 for receiving the threaded fasteners 58 to rigidly attach the piston 18, 28 to its respective yoke 22, 24. The central bore 66 of the piston is coaxial with the center axis 33 of the opposing pistons 18, 28. A bottom surface 67 of each piston 18, 28 has a total of four (4) threaded holes 68 located in four quadrants of the piston 18, 28 for rigidly attaching each piston 18, 28 to its respective yoke 22, 24 using the threaded fasteners 58. The flat surface 57 on the end of the yoke 22, 24 engages the flat surface 67 of the piston 18, 28 with both of these flat surfaces 57, 67 being perpendicular to center axis 33 of the two opposing pistons 18, 28. It is noted that the bottom surface 67 of the piston 18, 28 is configured as a planar web structure to provide a piston that is extremely light weight.

Referring back to FIGS. 1-3, each bearing block assembly 14 includes two identical bearing block halves 42, 44 and capture a pair of 180° bearing shells 46, 48 that surround the crank pin 32 in a slideable, rotatable manner. A plurality of threaded fasteners 50, such as bolts, and the like, hold the bearing block assembly 14 together. The two bearing block assemblies 14 are assembled around the crank pin 32 of the crankshaft 16. As shown in FIGS. 2 and 3, the crankshaft 16 has its main bearings 38, 40 positioned on the center axis 30 of the crankshaft 16 so that as the crankshaft 16 rotates, the crank pin 32 is rotating around the center axis 30 of the crankshaft 16 in an eccentric fashion.

In the illustrated example of the DASY X-4 engine crank train 10 shown in FIGS. 1-3, there are two bearing block assemblies 14 disposed about the crank pin 32 of the crankshaft 16 with each bearing block assembly 14 axially separated from one another and occupying a space along the outer surface of the crank pin 32 and each facing in a different orientation. Specifically, in the example of the DASY X-4 engine crank train 10, the two bearing block assemblies 14 are oriented 90° with respect to each other.

As mentioned earlier, each bearing block assembly 14 is coupled to its respective DASY assembly 12 by two linear bearing surfaces 34, 36 located at opposing ends of the bearing block assembly 14.

Figure 6:
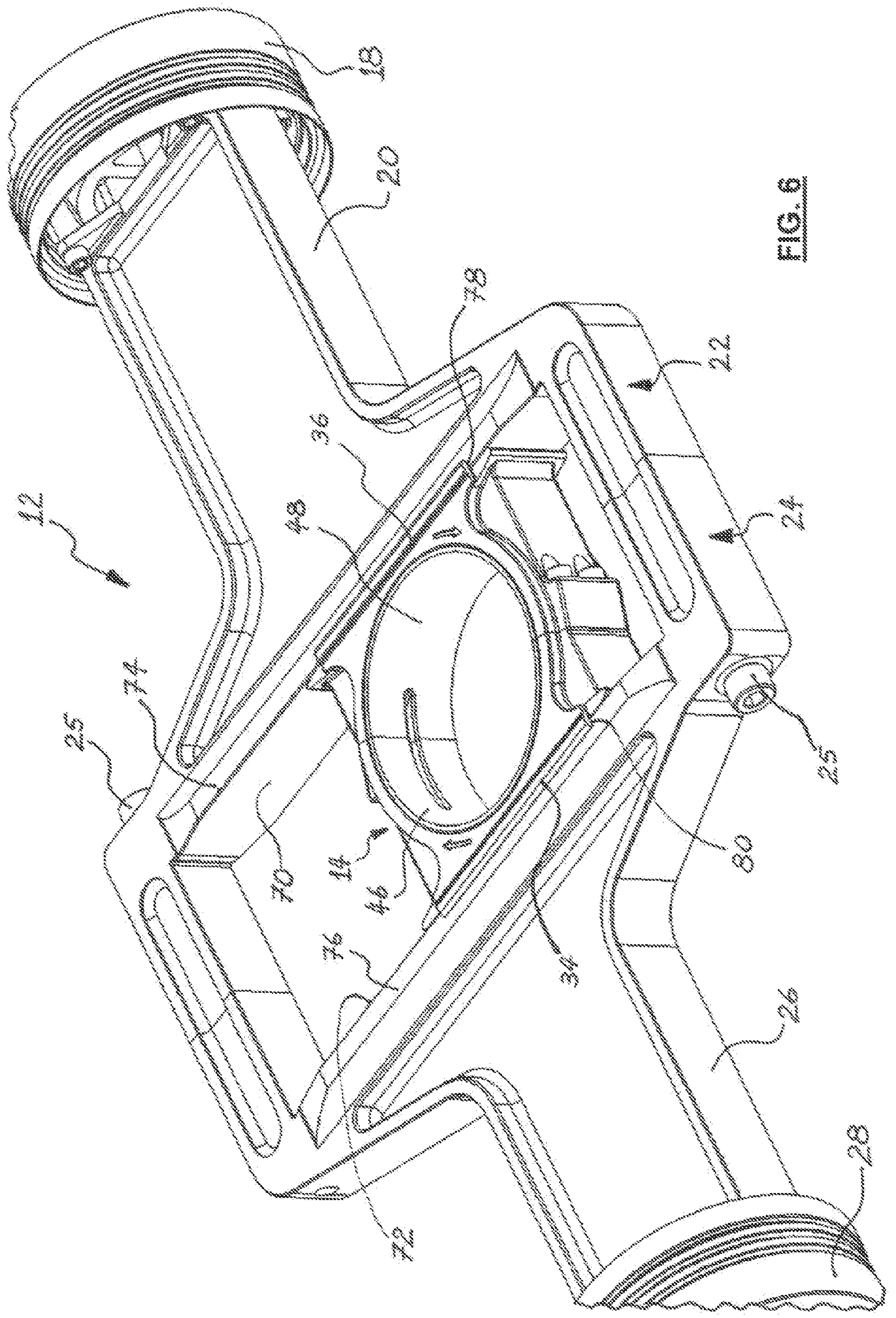
FIG. 6 is a partial isometric view of the interaction between the linear bearing surfaces on the DASY assembly and the bearing block assembly.

Referring now to FIG. 6, there is shown the DASY assembly 12 and the bearing block assembly 14 with other parts removed for clarity. Each yoke 22, 24 include linear bearing surfaces 70, 72 in an opposing relationship (facing each other) that interface with the linear bearing surfaces 36, 34, respectively, on the bearing block assembly 14. Each yoke 22, 24 further include anti-rotation bearing surfaces 74, 76. The anti-rotation bearing surfaces 74, 76 are coplanar and interface with anti-rotation bearing surfaces 78, 80 of anti-rotation bearing support structures 77, 79 on the bearing block assembly 14 (FIGS. 7(*a*) and 7(*b*)). The anti-rotation bearing surfaces 74, 76 on the yokes 22, 24 in combination with the anti-rotation bearing surfaces 78, 80 on the bearing block assembly 14 comprise an anti-rotation feature of the invention. It should be noted that there is also a set of anti-rotation bearing surfaces 74, 76, 78, 80 on the other side of the DASY assembly 12 and that bearing block assembly 14 that are not visible in this view that are mirror-images of the anti-rotation feature just explained. The anti-rotation feature of the invention prevents the DASY assembly 12 from rotating on its roll-axis, which is the axis of the pistons 33, to keep the DASY assemblies properly aligned and prevent adjacent DASY assemblies from colliding with each other or with the crankshaft, and also maintains proper mechanical contact at the linear bearing interface.

Figure 7B:
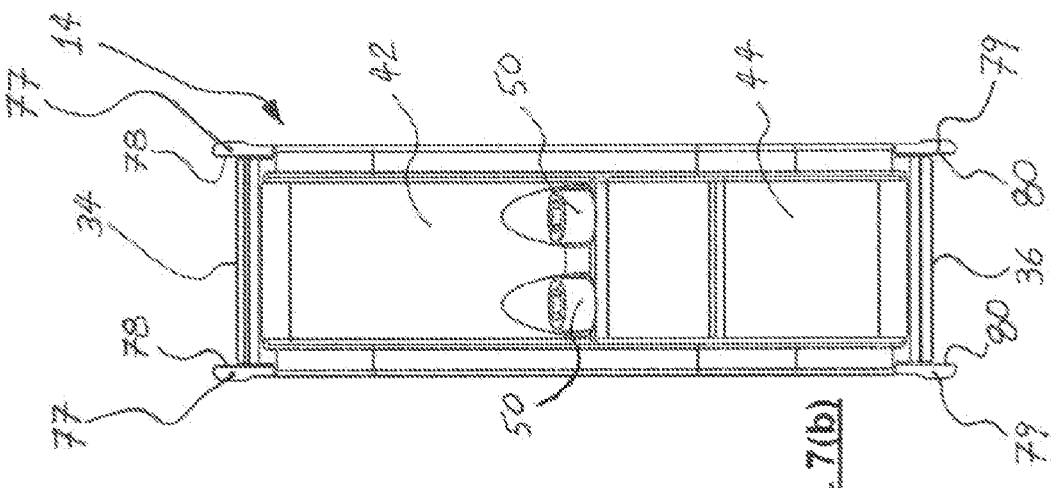
FIGS. 7(*a*) and 7(*b*) are top and side views, respectively, of the bearing block assembly of FIG. 1 showing the maximum width for the protruding structures which support the anti-rotation bearing surfaces that is less than ninety (90) degrees with respect to the center axis of the bearing block assembly to allow for minimum spacing for adjacent DASY assemblies.
Figure 7A:
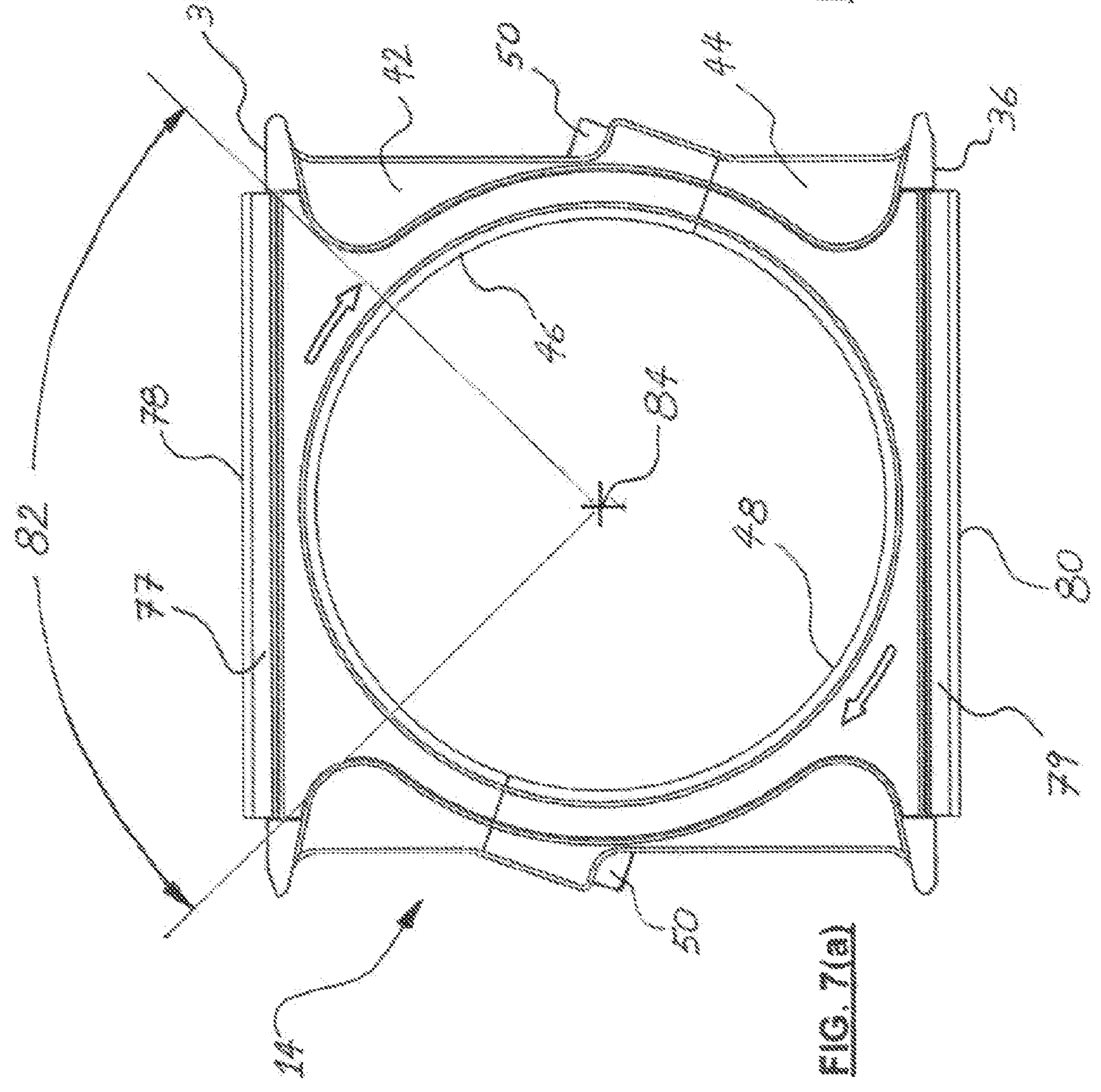

FIG. 7(*a*) shows a side view of the bearing block assembly 14. FIG. 7(*b*) shows an end view of the bearing block assembly 14. As shown in FIG. 7(*a*), the anti-rotation bearing support structures 77, 79 on the bearing block assembly 14 define an envelope angle 82 less than ninety (90) degrees with respect to a center axis 84 of the bearing block assembly 14. As shown in FIG. 7(*b*), these protruding anti-rotation bearing support structures 77, 79 form the widest part on the bearing block assembly 14.

Figure 8A:
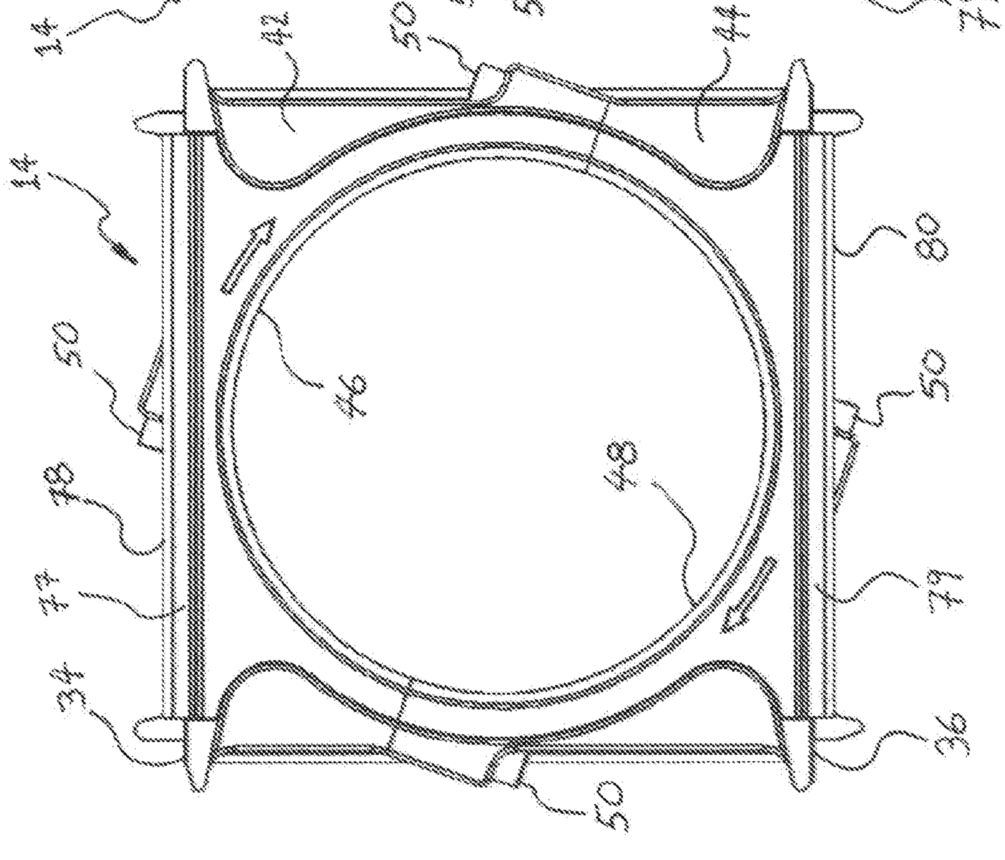
FIGS. 8(*a*) and 8(*b*) are top and side views, respectively, of adjacent bearing block assemblies packaged in an X-engine configuration revealing the packaging advantage of shorter anti-rotation bearing surfaces.
Figure 8B:
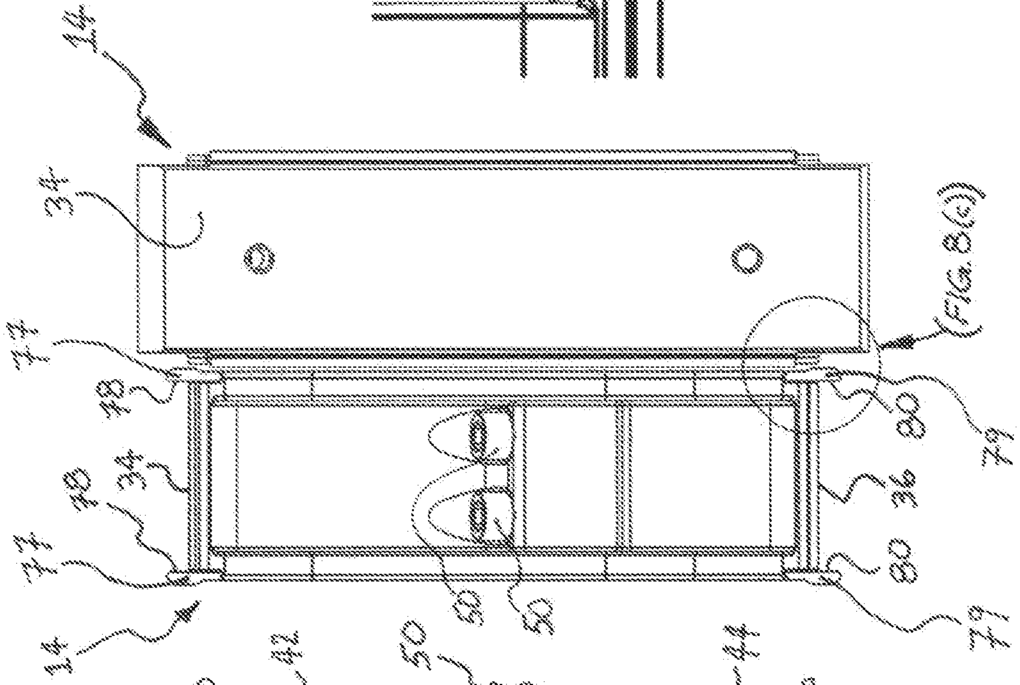
Figure 8C:
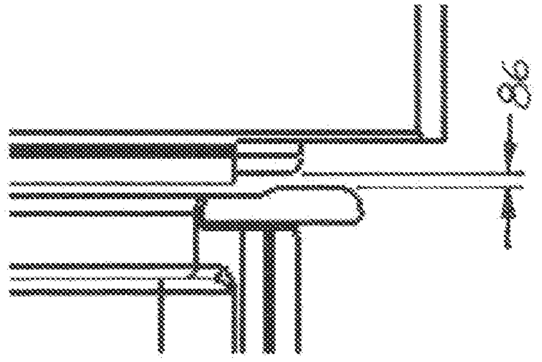

As shown in FIGS. 8(*a*)-8(*c*), the angle 82 being less than ninety (90) degrees enables adjacent DASY assemblies 12 to package next to each other in an "interlocking" fashion for a given minimum clearance distance 86 when two bearing block assemblies 14 are installed on the same crank pin 18 as in an X-4 engine crank train 10 with 90° X-angle. By limiting the width of the protruding anti-rotation feature to less than 90 degrees as described allows for the widest possible linear bearing surface in relation to the engine bank offset to help provide acceptably low bearing pressures during operation. It should be understood that the X-4 engine crank train described herein has a 90 degree X-angle, however the angular relation for adjacent DASY assemblies may be any angle between zero and 180 degrees.

Figure 9A:
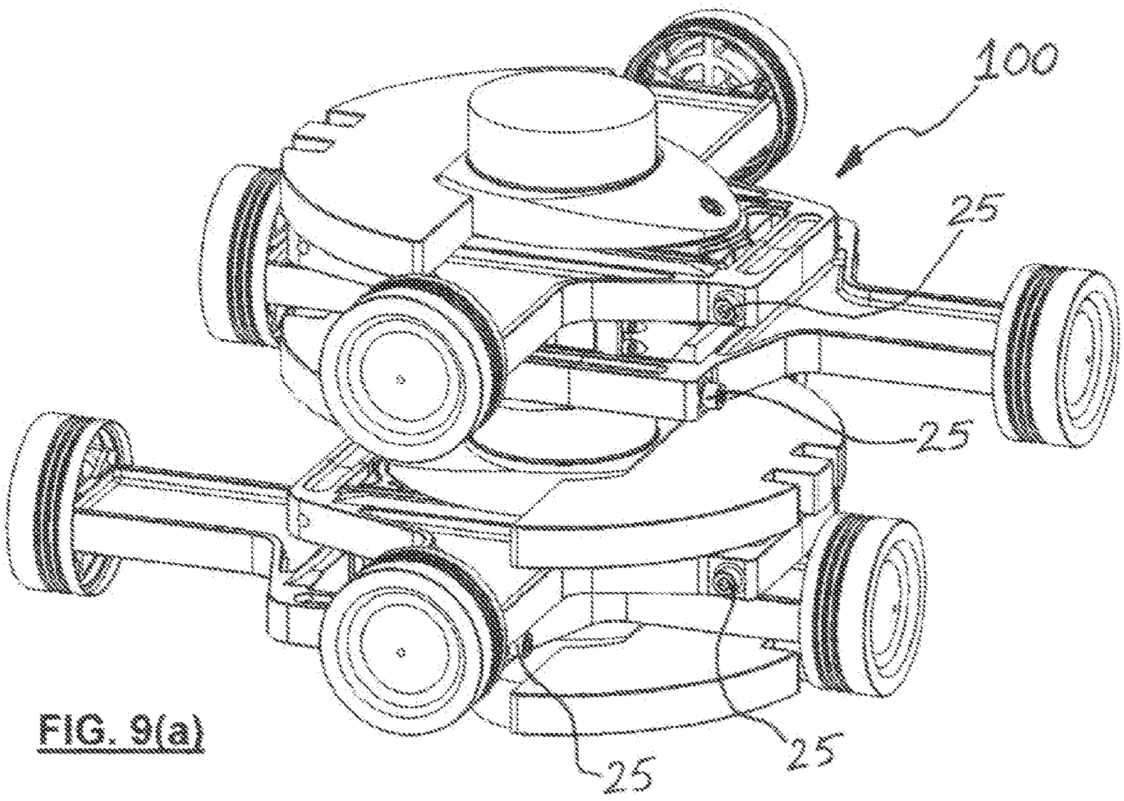
FIGS. 9(*a*) and 9(*b*) are isometric and side views, respectively, of a DASY X-8 engine crank train when assembled according to an embodiment of the invention.
Figure 9B:
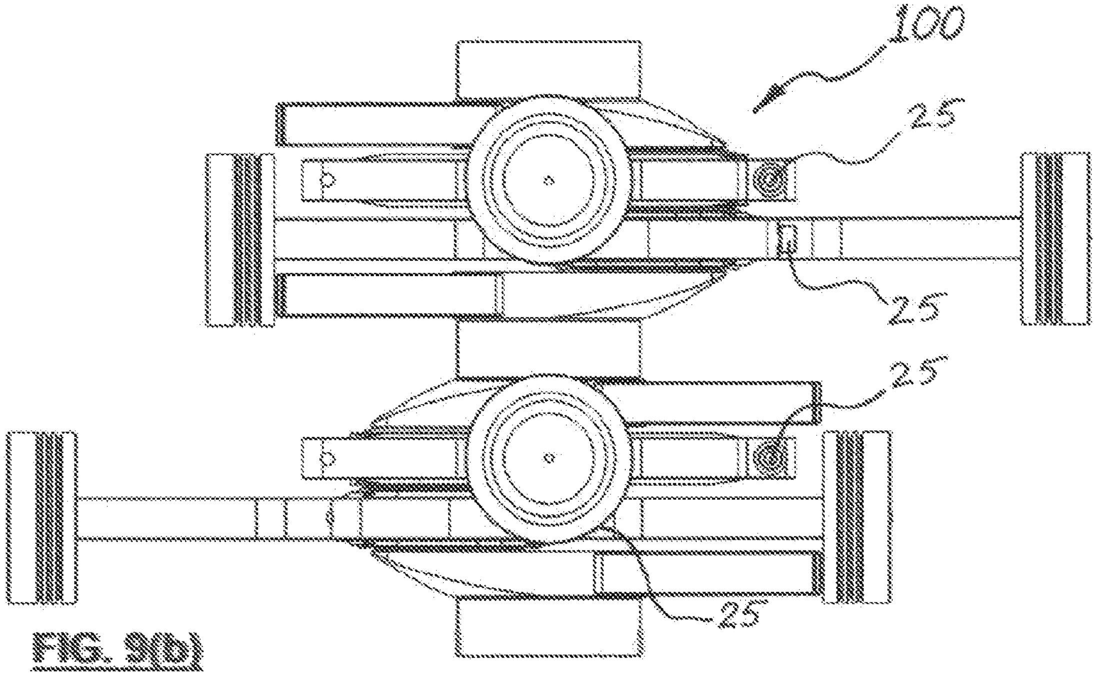
Figure 10A:
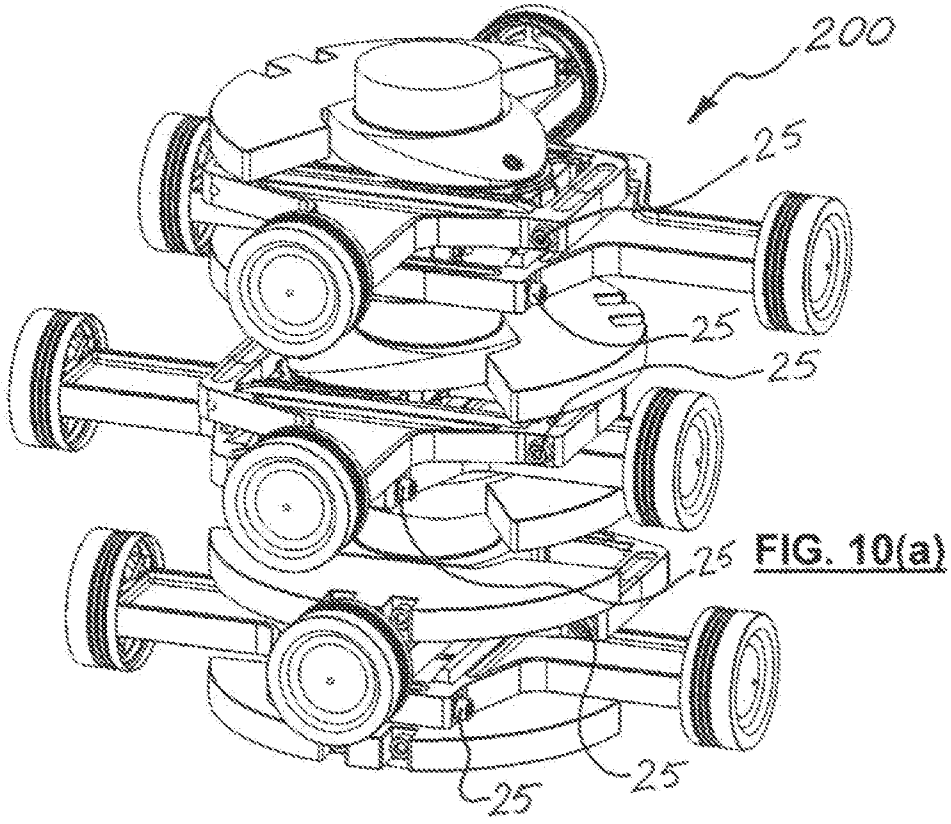
FIGS. 10(*a*) and 10(*b*) are isometric and side views, respectively, of a DASY X-12 engine crank train when assembled according to an embodiment of the invention.
Figure 10B:
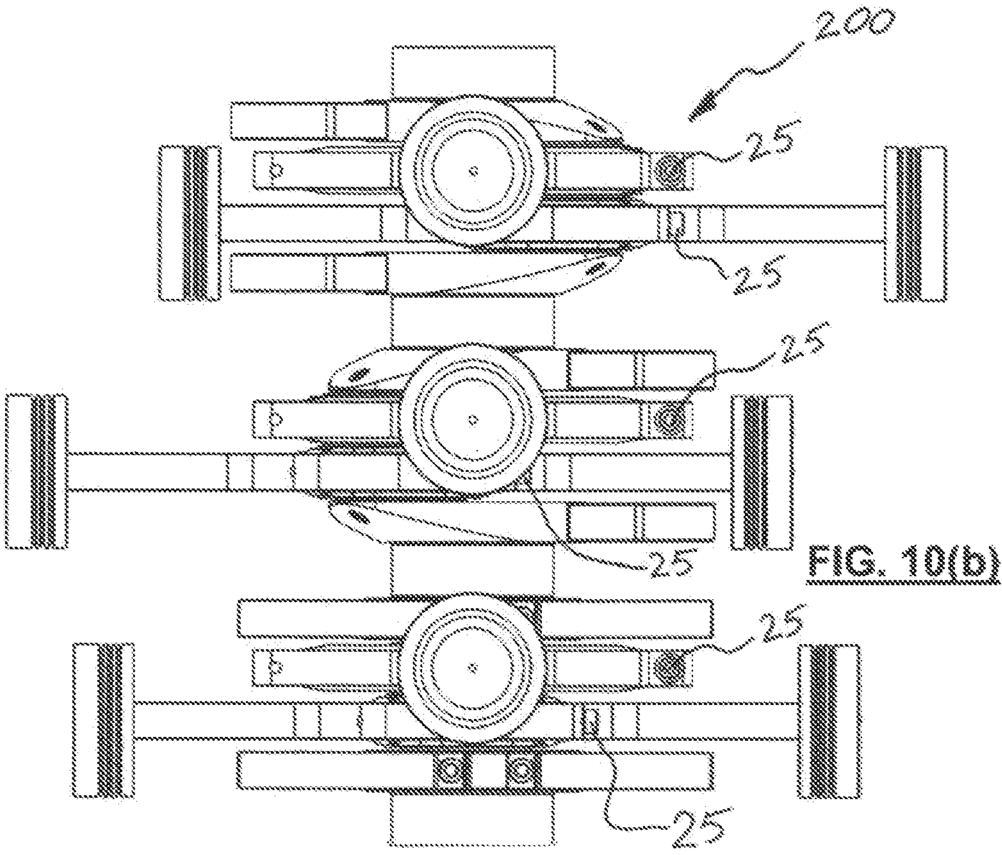

Placing a plurality of the DASY X-4 engine crank train 10 in series on a single crankshaft 16 creates DASY X-8, X-12, X-16, and so on, X-engine configurations. For example, FIGS. 9(*a*) and 9(*b*) show a DASY X-8 engine crank train 100 by placing two DASY X-4 engine crank trains 10 on a single crankshaft 16. In another example, FIGS. 10(*a*) and 10(*b*) show a DASY X-12 engine crank train 200 by placing four X-4 engine crank trains 10 on a single crankshaft 16.

By changing the angular arrangement of the crank pins on the crankshaft, one can make any of these configurations more compatible for a specific engine cycle, such as the four-stroke cycle, the two-stroke cycle or other engine cycles. So, it can be seen that there is considerable potential for X-engines to satisfy many different applications with different engine cycles and different performance requirements and different package requirements. The X-engines of the invention have crankshafts that are almost half the length of "V" engines for the same number of cylinders which make the larger size engines with 12 or 16 or 20 cylinders, for example, more feasible.

Furthermore, the X-engine configuration with Double-Acting Scotch Yoke (DASY) assemblies of the invention is more favorable from a balance standpoint. For example, an eight cylinder "X-8" engine for four-stroke cycle and even-firing has four DASY assemblies and a two-pin crankshaft with each crank pin being mechanically linked to two DASY assemblies, and having the two DASY assemblies on each crank pin oriented at 90° relative to each other, and having the DASY assemblies offset in the direction of the crankshaft axis so as to allow each mechanism to operate freely of each other. The crankshaft for the X-8 is configured with the two crank pins oriented 180° opposite the crankshaft centerline, and has three main bearings with one at either end and a single main bearing located in between the two crank pins, and has counterweights which cancel the rotating moment.

The resultant X-8 engine configuration is 100% balanced for forces and moments of all orders of vibration—a result which is more favorable than any currently produced piston engine that uses con-rods.

For X-engines that have 'split-pin' crankshafts, the two bearing block assemblies 14 are attached to angularly separate crank pins that are located next to each other on the crankshaft 16. A split-pin crankshaft changes the relative timing of the reciprocating motion of the DASY assemblies while still having substantially the same width for the bearing blocks and the same bank offset as a single pin configuration, as described herein for the X-4 crank train 10. Thus, it enables different firing intervals to be used to suit different numbers of cylinders, different X-angles, and/or different engine cycles.

In summary, these following relations exist in the DASY assembly 12 of the invention:

1) the basic building block of the DASY assembly 12 is a series of four parts joined together: "piston-yoke-yoke-piston" with all of the interfaces between the components in the DASY assembly 12 being flat-to-flat interfaces with the planes of the interfaces being perpendicular to the axis of the opposing cylinders. These interfaces include: pistons-to-yokes, yoke-to-yoke. This condition provides the most robust interfaces for transmitting compressive loads due to combustion forces and inertia forces. It is also in favor of manufacturing the components for high-precision and low cost, with the precision being important for controlling the engine's compression ratio. And lastly, it is also a favorable condition for completing the assembly of the engine bottom end because the yokes must be assembled to the bearing blocks with the bearing blocks being assembled around the crank pins of the crankshaft;

2) the width of the DASY assembly 12, with the exception of the pistons, as viewed from a perspective that shows the crankshaft axis and cylinder bore axes, is substantially equal to the width of the pin bearing which is at the interface between the bearing block and the crank pin. This allows for a functional reliable system which packages four cylinders in the same axial space (with regards to the crankshaft axis) for which a "V"-type engine packages two cylinders;

3) all of the components in the DASY assembly 12 are aligned using dowels with the axes of all of the dowels being parallel to the common, center axis of the opposing pistons. This condition allows the parts to be easily assembled while providing a precise finished assembly with the two piston outer diameter surfaces being substantially in a common cylindrical envelope, and also having the two scotch yokes linear bearing surfaces being in a parallel condition to each other and perpendicular to the axis of the two pistons, and having the four linear bearing surfaces for anti-rotation on the sides of the yokes being in a twice parallel condition so they interface properly with the anti-rotation bearing surfaces on the bearing block assembly;

4) all of the dowels in the reciprocating assembly are located at the flat-to-flat interfaces and press-fit into corresponding precision holes in each of the mating parts at each interface;

5) all of the axes of the threaded fasteners in the DASY assembly 12 are parallel to the axis of the opposing-pistons. This condition is most preferable for transmitting tensile loads resulting from the tensile inertia forces acting on the assembly during the running of the engine and allows 100% of the fastener's clamp force to be utilized in securing the parts together;

6) the threaded fasteners 25 for attaching the yokes 22, 24 in the DASY assembly 12 are open and accessible on axes which are substantially offset from the pistons and are parallel to the axes of the opposing pistons and on a plane, which is perpendicular to the axis of the crankshaft. This provides a means to complete the scotch yoke assemblies around the bearing blocks with a fully-counterweighted crankshaft in place, as is evident is FIG. 9(*b*) and FIG. 10(*b*);

7) a preferred embodiment of the DASY assembly 12 is for a single dowel that aligns the piston with its mating part and is located on the primary axis of the piston and the axis of the cylinder bore. However, it is also possible to use two dowels to more accurately locate the piston for its angular location as well as to align the axis; and 8) a preferred embodiment of the DASY assembly 12 is for a single dowel hole at the piston-end of the yoke and having the dowel located on the axis of the cylinder bores.

The advantages of the DASY assembly 12 over previous systems of a similar type are:

1) The width of the bearing block and the yoke structure that extends between the opposing pistons is substantially equal to the width of a comparable "V"-engine connecting rod. This is important because it allows for the ideal X-engine package which is similar to two "V" engines placed back-to-back, because, as there are two connecting rods engaged with each crank pin for a "V"-engine, there are two double-acting scotch yokes engaged with each crank pin for an X-engine. Thus, the X-engine can be designed with substantially the same bank offset as would be used for a conventional "V" or inline engine using connecting rods with the same basic engine dimensions: bore, stroke and bore spacing.

This allows for an X-engine which has a cylinder bore spacing that is not compromised to allow package space for the reciprocating parts, and has cylinder block internal structures that are very similar that that which is used for a comparable "V" engine, and still have space inside the crankcase for robust cheek widths and balance counterweights on the crankshaft. The end result is an X-engine that is nearly half the length of a "V" engine with the same number of cylinders.

Previously scotch yoke systems that have fasteners oriented on axes that are non-parallel to the cylinder bore axes are very likely to have a larger package width in the direction of the crankshaft axis as well as compromising the strength of the assembly since the force is not transmitted along the bolt axes but instead relies on the static friction at the interface which is much less than the clamp force of the bolt along the axis of the bolt.

2) The entire reciprocating assembly is aligned with dowels to achieve high precision for the entire assembly. It is necessary to precisely place the center of gravity of the reciprocating assembly on the cylinder bore axis because this is important for minimizing vibration in the running engine, and also to achieve a precise concentricity for the cylindrical outer diameters of the two pistons which work together to absorb side loads resulting from the forces transmitted in and out of the rotating crank pin, and also for the precision of the four anti-rotation linear bearing surfaces on the sides of the yokes which also must work together to absorb side loading resulting from possible offset loads on the reciprocating assembly which result when the friction loading on the main linear bearing is off center.

3) All of the interfaces between the parts, yoke-to-yoke, yoke-to-piston, are flat-to-flat interfaces which are perpendicular to the cylinder bore axis. This is the most preferred geometry for the axial precision of the assembly which affects compression ratio control, and is preferred for transmission of the large compressive forces due to gas pressures and inertial loads, and is also the most preferred shape for ease of manufacturing and ease of assembly.

4) Bolt access for the yokes is offset from the pistons and is open even when the yokes are being attached around the bearing blocks with a crankshaft in place. All of the bolt heads can be accessed with wrenches from two diagonally opposite sides with the crankshaft already in place for the X-engine configurations, such as the X-4 engine crank train shown in FIG. 3(*b*). This feature is important for X-engines because it enables simplified assembly methods and simplified structure of the cylinder block. In the DASY X-8 and the DASY X-12 engine crank trains 100, 200 shown in FIGS. 9 and 10, all of the yoke bolts (bolts which secure the yoke-to-yoke interface) in the DASY assembly 12 can be accessed from the diagonally opposite sides. This is an important feature for X-engines because the crankshaft for X-engines has counterweights that are necessary to balance the engine and also to control main bearing loads. As mentioned previously, the final assembly of the scotch yoke is around the bearing blocks which are assembled onto the crankshaft. Hence, it is very desirable to be able to access and install the yoke bolts in the double-acting scotch yoke X-engine from the side. If the bolt installation could not be done from the side it would necessitate compromising the cylinder block structure or the bore spacing or some other critical design parameter of the engine.

5) The DASY assembly 12 provides improved fuel economy over conventional piston engine configurations (in-line, "V", flat, etc.) because friction in the crankcase due to fluid motion or "windage" is minimal because the DASY assembly 12 has pairs of opposing pistons moving together so the volume inside each four cylinder grouping remains constant and there is no fluid displaced across bulkheads during operation. None of the popular piston engine configurations (in-line, "V", flat, etc.) exhibit this characteristic. The 90° V-8 engine for example, due to its 'cruciform' crankshaft, has large amounts of internal fluid flow from the front of the engine to the rear of the engine and back on each crankshaft revolution resulting in significant amounts of fluid motion and friction. The I-4, I-6 and I-8 also suffer from a similar phenomenon, as does the V-6, V-10, V-12, V-14, V-16, etc. Hence, "V" and in-line engine configurations have more friction because they have a larger mass of fluid in motion inside the crankcase than would a comparable (ie., same displacement and same number of cylinders) DASY X-engine.

Furthermore, potential fuel economy benefits may result from the sinusoidal piston motion which causes a longer piston dwell period at the top of the stroke which can allow for more complete combustion before the majority of the power stroke occurs.

6) All DASY X-engine configurations from 4 to 32 cylinders and beyond can have 100% balance for all orders of vibration.

The scotch yoke system is simple harmonic motion so the only balancing consideration is for $1^{st}$-order (at engine speed) vibration. All of the DASY X-Engines achieve total balance for all orders of vibration either inherently or with use of a single $1^{st}$-order moment-balance shaft. The DASY X-8 engine, for example, is unique among all 8-cylinder engine configurations because it is the only one with inherent 100% balance for all orders of vibration.

Engines which employ conventional con-rods induce vibration of the $1^{st}$, $2^{nd}$, $3^{rd}$, $4^{th}$, $5^{th}$ orders and higher. Some of these configurations are balanced for $1^{st}$ and $2^{nd}$ orders (such as the V-8 with a four-pin 'cruciform' crankshaft), whereas many of the popular engine configurations—such as the I-4, the 60° V-6, the 90° V-6—have one or two balance shafts to help reduce vibration, but none of the engine configurations which employ connecting rods have total balance for all orders—that is, none of them are balanced for $3^{rd}$-order vibrations and higher.

Crankshaft torsional loading due to inertia forces from the reciprocating masses is net-zero in DASY X-Engines, whereas systems with con-rods have multiple-order inertia pulses which do not cancel. The 90° DASY X-4, X-8, X-12, etc. engines exhibit a torque cancellation effect whereby one DASY mechanism is accelerating while another one is equally and oppositely decelerating so the result is a constant net-zero torque load at the crankshaft resulting from reciprocating masses.

Having described presently preferred embodiments the invention may be otherwise embodied within the scope of the appended claims.

What is claimed is:

1. An X-engine crank train comprising:

a pair of Double-Acting Scotch Yoke assemblies, each one consisting of a first yoke, a second yoke attached to the first yoke at a first interface, a first piston attached to the first yoke at a second interface, and a second, opposing piston attached to the second yoke at a third interface such that the two pistons are at opposite ends of the Double-Acting Scotch Yoke assembly, wherein one leg of the first yoke and the second yoke includes a non-threaded hole, and the other leg of the first yoke and the second yoke includes a threaded hole for receiving a threaded fastener, and wherein the first and second yokes are attached to each other using two threaded fasteners that are diagonally opposite each other, and wherein the threaded fasteners attaching the first and second yoke of one of the pair of Double-Acting Scotch Yoke assemblies are non-parallel with respect to the threaded fasteners attaching the first and second yokes of the other one of the pair of Double-Acting Scotch Yoke assemblies, wherein the two Double-Acting Scotch Yoke assemblies are coupled to a crankshaft, and wherein the two Double-Acting Scotch Yoke assemblies are angularly offset relative to each other about the axis of the crankshaft, and wherein the two Double-Acting Scotch Yoke assemblies are offset relative to each other along the axis of the crankshaft, and wherein the threaded fasteners are accessible from two diagonally opposite corners.

2. The X-engine crank train according to claim 1, further comprising a plurality of X-engine crank trains that are coupled to a common crankshaft.

3. An X-engine crank train comprising:

a pair of Double-Acting Scotch Yoke assemblies, each one consisting of a first yoke, a second yoke attached to the first yoke at a first interface, a first piston attached to the first yoke at a second interface, and a second, opposing piston attached to the second yoke at a third interface such that the two pistons are at opposite ends of the Double-Acting Scotch Yoke assembly, wherein the first and second yoke are attached to each other using two threaded fasteners that are diagonally opposite each other, and wherein the threaded fasteners attaching the first and second yoke of one of the pair of Double-Acting Scotch Yoke assemblies are non-parallel with respect to the threaded fasteners attaching the first and second yokes of the other one of the pair of Double-Acting Scotch Yoke assemblies, and wherein the two Double-Acting Scotch Yoke assemblies are coupled to a crankshaft, and wherein the two Double-Acting Scotch Yoke assemblies are angularly offset relative to each other about the axis of the crankshaft, and wherein the two Double-Acting Scotch Yoke assemblies are offset relative to each other along the axis of the crankshaft, and wherein the threaded fasteners are accessible from two diagonally opposite corners.

4. The X-engine crank train according to claim 3, further comprising a plurality of X-engine crank trains that are coupled to a common crankshaft.

5. An X-engine crank train comprising:

a pair of Double-Acting Scotch Yoke assemblies, each one consisting of a first yoke, a second yoke attached to the first yoke at a first interface, a first piston attached to the first yoke at a second interface, and a second, opposing piston attached to the second yoke at a third interface such that the two pistons are at opposite ends of the Double-Acting Scotch Yoke assembly, wherein a bearing block assembly is disposed between the first and second yokes of each Double-Acting Scotch Yoke assembly, and wherein each bearing block assembly is coupled to the crankshaft such that the center axis of the bearing block assembly is concentric with a crankpin, wherein each bearing block assembly comprises two halves which are attached to each other, and wherein the two Double-Acting Scotch Yoke assemblies are angularly offset relative to each other about the axis of the crankshaft, wherein the two Double-Acting Scotch Yoke assemblies are offset relative to each other along the axis of the crankshaft, and wherein each bearing block assembly further comprises protruding anti-rotation bearing support structures with anti-rotation bearing surfaces for interfacing with anti-rotation bearing surfaces on each yoke, and wherein each protruding anti-rotation support structure of a bearing block assembly defines an envelope angle of less than ninety degrees with respect to the center axis of the bearing block assembly.

* * * * *